INVENTORS
*Willem Hendrik Aarts*
*Henry Cloete Goldie*

Attorneys

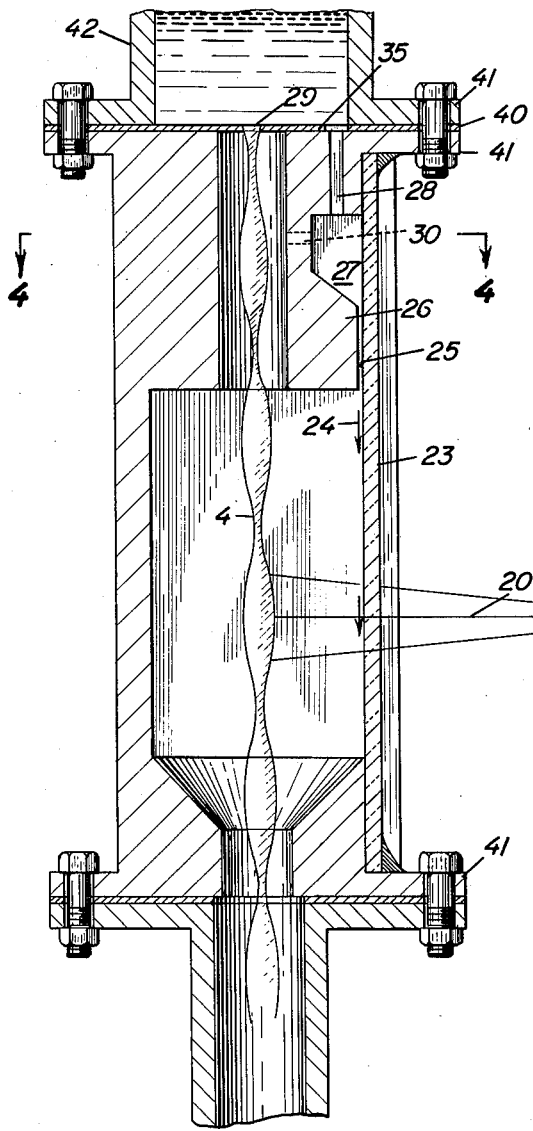
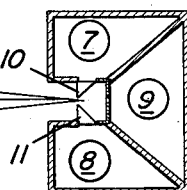
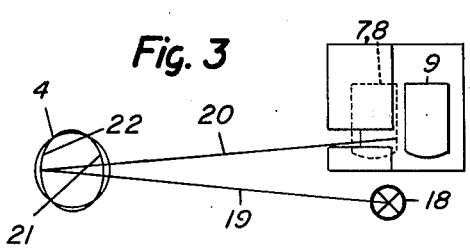
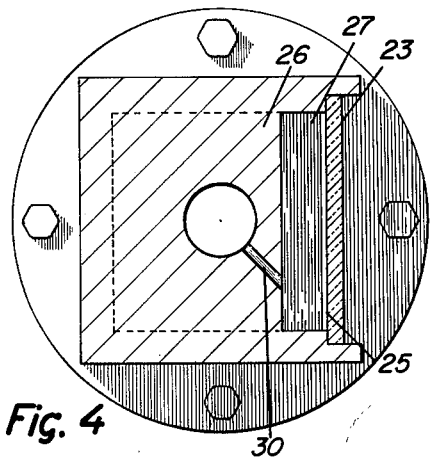

3,030,802
METHOD AND APPARATUS FOR THE CONTINUOUS MEASUREMENT AND RECORDING OF THE CONCENTRATION OF ONE COMPONENT OF LIQUID PHASE SOLUTIONS

Willem Hendrik Aarts, Johannesburg, Transvaal Province, and Henry Cloete Goldie, Germiston, Transvaal Province, Union of South Africa, assignors to African Explosives and Chemical Industries Limited, P.O. Northrand, Transvaal Province, Union of South Africa
Filed June 30, 1958, Ser. No. 745,465
Claims priority, application Union of South Africa July 19, 1957
13 Claims. (Cl. 73—53)

This invention relates to a method and apparatus for the continuous measurement, recording and controlling of the concentration of one component of liquid phase solutions and more particularly it relates to the continuous and accurate measurement, recording and controlling of the concentration of one component of liquid phase solutions comprising two or more components, which said component may or may not dissociate into ions in the said solution, where variations in physical conditions and in physical properties may be encountered and where relatively small quantities of impurities may be present.

Many methods are known for the continuous measurement of the concentration of one component of liquid phase solutions among which may be mentioned refractive index measurement, electrical conductivity measurement and viscosity measurement. These known methods, while satisfactory for some industrial processes, all have disadvantages which confine their application and limit their usefulness. By way of example, refractive index measurement and electrical conductivity measurement may be affected by the presence of relatively small quantities of impurities in the said solution while viscosity measurement is sensitive to fluctuations in the temperature of the solution.

It is an object of this invention to provide a method and apparatus for the continuous measurement, recording and control of the concentration of one component of a liquid phase solution which is accurate within suitable limits and which is applicable to a wide variety of industrial processes. It is a further object of this invention to provide a method and apparatus for the said purpose, wherein the viscosities of the said solutions do not exceed about 1 poise, which is independent of and unaffected by wide temperature fluctuations and which is unaffected by the presence of, and varying concentrations of, relatively small quantities of impurities.

According to this invention, a method is provided for the continuous measurement of the concentration of one component of a liquid phase solution, such method comprising continuously measuring the surface tension of the said liquid phase solution.

The continuous measuring of the surface tension of the liquid phase solution is carried out on a jet of such liquid phase solution issuing from a particularly shaped orifice. The surface tension of the issuing jet of the liquid phase solution is employed for purposes of automatically rendering continuous measurement of the concentration of one component of the said liquid phase solution. The said issuing jet of the liquid phase solution is conveniently produced by forcing the liquid under constant head from an elliptically shaped orifice.

The surface tension of a liquid tends to make the surface area as small as possible. In this invention, the said tendency or characteristic is employed and accordingly in the case of a liquid jet of substantially elliptical cross-section discharged from an elliptical orifice, which is symmetrical about two mutually perpendicular planes, the surface tension tends to alter the shape of the cross-section of the jet until it is circular. The momentum of the liquid will, however, carry the liquid past the surface tension surface area equilibrium to a substantially elliptical cross-section, the major axis of which being at right angles to the major axis of the ellipse of the discharge orifice. This process of oscillation of the jet is repeated several times before the said equilibrium is reached and the jet assumes a constant substantially circular cross-section, or, alternatively, breaks up into drops.

The period of oscillation of the jet is only very slightly affected by the viscosity of the liquid provided that the said viscosity is not more than moderate, although the viscosity determines the damping of the oscillations. Thus, for any particular shape and size of orifice (which determines the mass of the liquid) the period of oscillation of the liquid jet comprising liquid of not more than moderate viscosity is determined by the ratio of surface tension to density $(T/\rho)$ where $T$=surface tension and $\rho$=density.

In the case of a liquid jet discharging from a small orifice below a constant head of liquid in a comparatively large vessel, Torricelli's theorem states that $v^2 = 2gh$, where $v$=the velocity of the jet, $g$=the acceleration of gravity and $h$=the height of the free surface of the liquid above the jet. This effect may be achieved by maintaining a constant head of liquid in the said vessel and by the use of a comparatively large off-take pipe of convenient shape leading to a knife-edge orifice. The velocity of the jet is thus independent of the density, the temperature and the viscosity of the liquid.

Both $T$ and $\rho$ are dependent on temperature but in general it can be said that the temperature coefficient of surface tension is far greater than the temperature coefficient of expansion and that for practical purposes it is thus the only variable of importance. Thus where $T$ and $\rho$ are functions of temperature, which function may or may not be linear, a temperature compensating resistor, adjusted for the particular liquid on which it is desired to carry out measurements, may be provided.

For a jet of constant velocity the aforesaid oscillations during the period of oscillation form standing waves, the wavelengths of which are dependent on the ratio $T/\rho$, so that as $T$ changes, the said waves will move along the jet.

The standing waves form a system of lenses and mirrors, each with varying radii of curvature, so that utilizing a convenient source of light, a reflection may be obtained from the surface of the jet which is similar to that obtained from a convex mirror. Light passing through the surface of the jet is refracted by what is in effect a converging lens, is then reflected by a concave surface at the far side of the jet from the source of light and is refracted again by a converging surface on emergence from the jet. The two beams of light reflected from the front and rear surfaces of the jet will coincide if the incident light is on the optical axes of the said lens surfaces. Thus with the light beam positioned in any plane normal to the axis of the jet the position of the maximum or minimum amplitude of a wave may be accurately indicated by means of a detecting device, which may for example be a telescope, and the greater the distance of the said telescope from the jet, the more accurately the movement of the wave can be followed.

The light detecting device is conveniently mounted on guided carriage-like means together with an arrangement of prisms, lenses, photo-multiplier tubes and the aforesaid light source, which latter is positioned so that one wavelength of the oscillating jet is illuminated.

When the carriage-like means is positioned on the optical axis of any reflecting surface of the jet a "bright spot" may be observed through the telescope. Positioned in front of the observation end of the telescope and with a small space between them are two prisms so that the image of the reflected surface of the jet is formed across them and is reflected through lenses to two photo-multiplier tubes, one on each side of the detecting telescope.

Instead of the method above described whereby a reflection is obtained from the surface of a jet, similar to that obtained from a convex mirror, use is made of a narrow transverse parallel beam of light from a convenient source to illuminate one wavelength of the said oscillating jet, the standing waves thereof, which are in the form of lenses, focussing the said parallel beam of transmitted light.

It was ascertained that by means of a light detecting unit positioned in the focal plane of one of the said lenses, the position of the maximum and minimum amplitude of a wave may be accurately indicated. The light detecting unit is also conveniently mounted on a guided carriage-like means together with a convenient arrangement of prisms, lenses and photo-multiplier tubes.

When the carriage-like mean is positioned in the focal plane of one of the standing waves formed by the oscillating jet, light, transmitted through the lens, which is in fact the said wave, falls between two prisms. Said prisms are positioned at a small space between them so that the image of the illuminated wavelength of the jet is formed across them and is reflected through lenses to two photo-multiplier tubes.

It has also been ascertained that, if a wavelength of the aforesaid jet is completely illuminated by a parallel light beam, those parts of the jet forming concave cylindrical lenses also receive light and a diffuse background is apparent and affects the two photo-multiplier tubes. In order to overcome this difficulty which can result in inaccurate readings being obtained, suitable masking of the light beam may be adopted so that the said jet wavelength is illuminated by a narrow pencil of light on one convex cylindrical lens only.

By means of a suitable amplifier and relay, gearing and electric motor, should the guided carriage-like means be slightly to one side of the reflected surface or the illuminated standing wave of the jet so that light falls on only one of the said prisms and only one of the said photo multiplier tubes is activated, movement by the said guided carriage-like means occurs until the said means is repositioned on the optical axis of the reflecting surface of the jet or in the focal plane of the illuminated standing wave. In this way, any change in the concentration of the liquid phase solution will be continuously measured, as once the carriage-like means has been positioned on to a particular reflecting surface or standing wave position of the jet, it will continue to follow and remain opposite the reflecting surface or the standing wave as the said surface or wave moves up and down the jet.

The position of the railed carriage determines the value of a second electrical circuit in which second circuit a temperature sensitive resistor of known type is included, which said resistor is in thermal contact with the liquid phase solution. Thus any change in the surface tension of the said solution, due to temperature fluctuation, may be automatically compensated for.

By known means the electrical output of this circuit may be visually observed as percentage concentration of the component of the liquid phase solution which it is desired to measure. Similarly a chart recording device and automatic equipment to control the particular industrial process may be included in the electrical circuit.

If preferred, the position of the railed carriage can be determined and the temperature compensation allowed for by known pneumatic or hydraulic means.

In order that the invention may be clearly understood and readily carried out in practice, reference will now be made to the accompanying sheets of drawings.

In the drawings:

FIG. 2 is a vertical cross-section of a part of the apparatus for using reflected light instead of transmitted light, as shown in FIGURE 1;

FIGURE 3 is a diagrammatic plan view of the light emitting and light receiving part of the apparatus shown in FIGURE 2;

FIGURE 4 is a cross-section on line 4—4 of FIGURE 2; and

Figure 1:
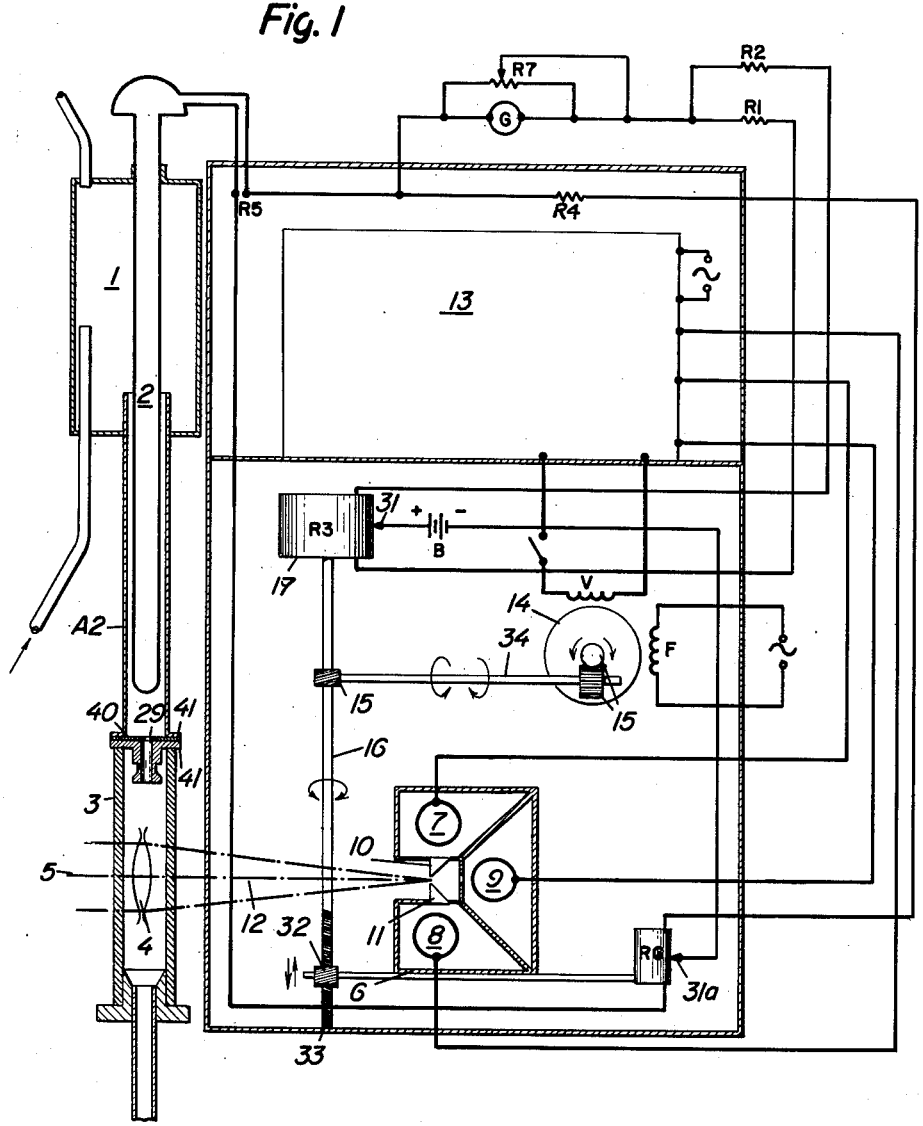
FIGURE 1 is a diagrammatic illustration of an apparatus according to the present invention for obtaining measurement of the concentration of one of the components of a liquid phase solution and in which transmitted light is used.

Referring to the drawings, the apparatus for using transmitted light, shown in FIGURE 1, comprises a constant head tank 1 which also acts as a trap for small solid particles. The liquid flows past a platinum resistance thermometer 2 to a vessel 3 in which the oscillating jet 4 is coaxially directed and through which a parallel beam of light 5 is transversely directed to fall on the jet 4. The oscillating jet 4 is produced by passing the liquid through an elliptical orifice 29 provided in a plate 40 clamped between fixing flanges 41 of the vessel 3 and a conduit 42 extending downwardly from the tank 1. The surface tension of the elliptically shaped jet issuing downwardly from the orifice 29 tends to make the surface area as small as possible, i.e. to substantially circular shape, but the momentum of the liquid will carry the liquid past the surface area equilibrium to a substantially elliptical cross-section of which the major axis is at right angles to the major axis of the orifice 29. This process of oscillation of the jet 4 is repeated several times before the said equilibrium is reached and the jet assumes a constant substantially circular cross-section, or alternatively, breaks up into drops.

A parallel beam of light 5 is focussed by the jet onto an image locater 6 which mounts two photo-multiplier tubes 7 and 8 and two closely spaced prisms 10 and 11. A third photo-multiplier tube 9 is also provided in the image locater 6 and is only activated when the focussed light beam 12 passes between the prisms 10 and 11. If the image locater 6 is positioned too low, the focussed beam of light 12 will fall on the upper prism 10 and be reflected thereby to the upper photo-multiplier tube 7 which will send an electrical signal to the amplifier located in a casing 13. The amplifier output, controlled by the photo-multiplier tube 7 output causes the motor 14 to rotate in a direction in order to raise the image locater 6 by means of gears 15 and threaded shaft 16. Conversely, if the image locater 6 is too high, the lower photo-multiplier tube 8 is activated and the image locater 6 caused to be lowered.

The image locater 6 consists of a casing provided with a fixed nut 32 which engages the screw thread 33 on the shaft 16. The shaft 16 is rotatably mounted in a vertical position and driven by an intermediate shaft 34 through worm gears 15. The shaft 34 in turn is driven through worm gears 15 from a motor 14 which is of a reversible kind. A drum potentiometer, indicated diagrammatically at 17 in FIGURE 1, is mounted on the screw shaft 16 for rotation therewith. On the image locater 6, a further drum potentiometer R6 is mounted for movement in a vertical direction with the image locater 6 and relative to a coacting fixed contact 31a. The drum potentiometer R6 is independently rotatable for adjustment purposes.

The casing 13, apart from housing the amplifier, may also house an electrical power unit B and other electrical equipment and associated circuits.

The aforesaid apparatus employs a light beam 5 which is transmitted through the oscillating liquid jet 4, but when reflected light is to be used the light beam is arranged as shown in FIGURES 2 and 3. The rest of the apparatus remains substantially the same as that illustrated in FIGURE 1. A light beam 19 obtained from a light source 18, comprising a fine straight filament source, is directed along the optical path 19 (see FIGURE 3) onto the jet 4. The light beam 19 is refracted at the first surface 21 of the jet 4 and reflected at the second surface 22, then refracted again at the first surface 21 and projected along optical path 20 to focus between the prisms 10 and 11 of the image locater 6.

When the concentration is to be measured of a liquid giving off noxious vapour, such as strong nitric acid for example, a window covered by a pane 23 of transparent material is provided between the oscillating jet 4 and the detecting apparatus. If the temperature of the jet 4 is higher than its surroundings, the noxious vapours may condense as drops on the jet side of the window pane 23, thus preventing accurate readings from being taken. To prevent this, the jet side of the window pane 23 is continuously swept downwards by a film 24 of the liquid of which the concentration is being measured. The channel 25 (shown larger than is required in practice for purposes of illustration only) whereby the film is formed and supplied to the pane surface, lies between the window pane 23 and a member 26 of a casing or vessel 3. The transverse measurement of such channel 25 may be convenient for the surface tension of the liquid being used (e.g. for an alcoholic solution in water the dimension is for instance three-thousandths of an inch). The film forming channel 25 is supplied from a reservoir 27 arranged substantially transversely in the casing or vessel 3 and above the member 26 and is fed by a supply capillary 28 from the constant head tank 1 through a hole 35 provided at a position adjacent the elliptical orifice 29 in the plate 40. An overflow opening 30 is also associated with the reservoir 27.

The electrical equipment is arranged in a Wheatstone bridge circuit (see FIGURE 5) and includes compensating means for temperature coefficient fluctuation. As the surface tension of the liquid being measured (e.g. nitric acid) may have a different temperature coefficient for different concentrations of the liquid, a compensating device is incorporated, as will be subsequently explained with reference to FIGURE 5, depending on the liquid being measured and the accuracy required.

The electrical apparatus comprises a drum potentiometer R3 (shown as 17 in FIGURE 1) engaged by a sliding contact 31 which moves in a vertical direction up or down on rotation of the drum 17 with the image locater and mainly alters the electrical flow. This drum potentiometer R3 is wound with manganin resistance wire, the number of such windings being specific for the liquid being measured. A second drum potentiometer R6 is mounted on the image locater 6 for movement with the latter and is arranged to compensate for concentration changes of temperature coefficient. This potentiometer is wound with manganin resistance wire and with high conductivity copper wire, the number of such winding being specific for the liquid being measured.

Figure 5:
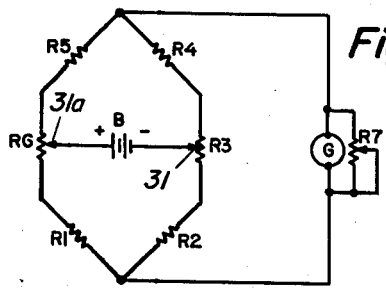
FIGURE 5 is a diagrammatic representation of electrical circuits for the arrangement according to FIGURES 1 and 2 and including compensating means for temperature co-efficient fluctuation.

The platinum resistance thermometer 2, indicated at R5 in FIGURE 5, is in theraml contact with the liquid and electrically connected with the resistors R1, R2 and R4 in the Wheatstone bridge arrangement.

With liquid of the proper concentration passing through the apparatus, the image locater 6 is set on an image while freed from the drum potentiometers R3.

What is claimed is:

1. A method for the continuous measurement of the concentration of one component of a liquid phase solution which comprises ejecting the said liquid phase solution at constant velocity through a non-circular orifice to form a jet of the solution which has a standing wave and continuously measuring the change in the shape of the liquid jet due to variations in the surface tension of the solution brought about by changes in concentration of one component thereof.

2. A method as claimed in claim 1 in which the step of measuring the change in the shape of the liquid jet comprises causing a beam of light to traverse the jet to indicate the changes in shape of the standing wave produced in the liquid jet.

3. A method as claimed in claim 2 in which the beam of light is transmitted through the jet.

4. A method as claimed in claim 2 in which the beam of light is reflected from the jet.

5. A method as claimed in claim 1 in which the liquid phase solution is ejected through an orifice which is elliptical in shape.

6. Apparatus for the continuous measurement of the concentration of one of the components of a liquid phase solution comprising means for ejecting a jet of the liquid phase solution at constant velocity, said means having a non-circular orifice through which the ejection takes place, a light source emitting a beam of light which extends transversely of the direction in which the solution will be ejected and intersecting the space in front of said orifice through which the jet will pass, a carriage movable parallel to the direction in which the jet will move, photoelectric devices on said carriage for sensing changes in the direction of the light beam coming from the jet and driving means actuated by said photoelectric devices in such a manner as to move the carriage in a direction and an amount sufficient to cancel any change in the said light beam coming from the jet.

7. Apparatus as claimed in claim 6 in which the light source is also mounted on the carriage and the light beam is reflected from the jet.

8. Apparatus as claimed in claim 7 and temperature compensating means in thermal contact with the said liquid phase solution and recording means actuated by said temperature compensating means, said carriage actuating said temperature compensating means.

9. Apparatus as claimed in claim 8 in which the photoelectric devices are adapted to sense the normal set direction of the incident light beam.

10. Apparatus as claimed in claim 6 in which said means comprise a constant head tank.

11. Apparatus as claimed in claim 10 in which the shape of the orifice is elliptical.

12. A method for the continuous measurement of the concentration of one component of a liquid phase solution which comprises ejecting the said liquid phase solution at constant velocity through an elliptical orifice to produce a jet having a standing wave and continuously measuring changes in the wave length of the standing wave produced on such jet by the surface tension of the solution.

13. A method as claimed in claim 12 in which the continuous measurement of changes in the wave length of the jet is effected by causing a beam of light to impinge on a particular portion of the jet, causing the light of that beam coming from such portion of the jet to impinge on light sensitive means adapted to react to any change in received light due to a change in shape of such portion of the jet resulting from an alteration in the wave length of the standing wave on the jet.

References Cited in the file of this patent

UNITED STATES PATENTS

| | | |
|---|---|---|
| 2,443,427 | Kidder et al. | June 15, 1948 |
| 2,483,102 | Pierson | Sept. 27, 1949 |
| 2,805,570 | Cannon | Sept. 10, 1957 |
| 2,926,528 | DeGiers | Mar. 1, 1960 |
| 2,934,944 | Eolkin | May 3, 1960 |

FOREIGN PATENTS

| | | |
|---|---|---|
| 902,663 | France | Dec. 22, 1944 |